E. G. WATROUS.
FLUSHING VALVE.
APPLICATION FILED APR. 30, 1913.
1,179,587.
Patented Apr. 18, 1916.
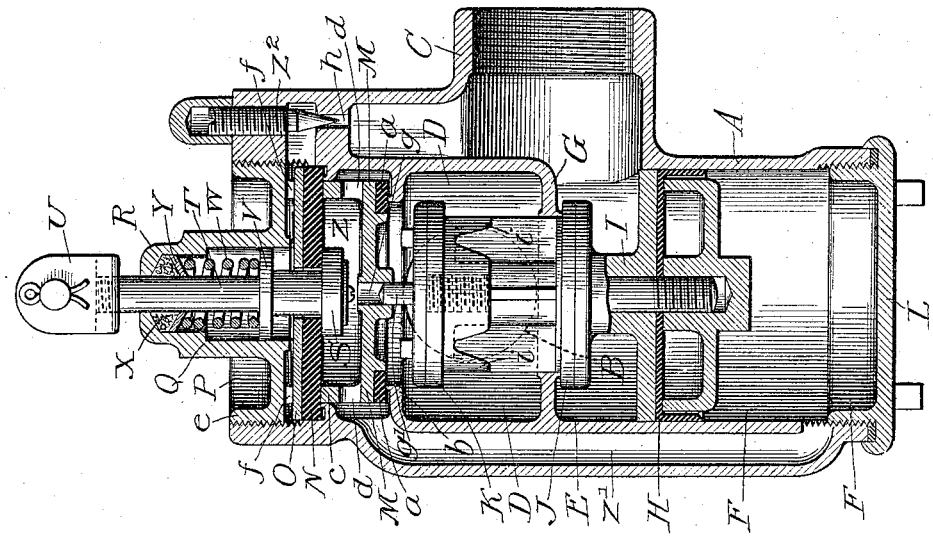
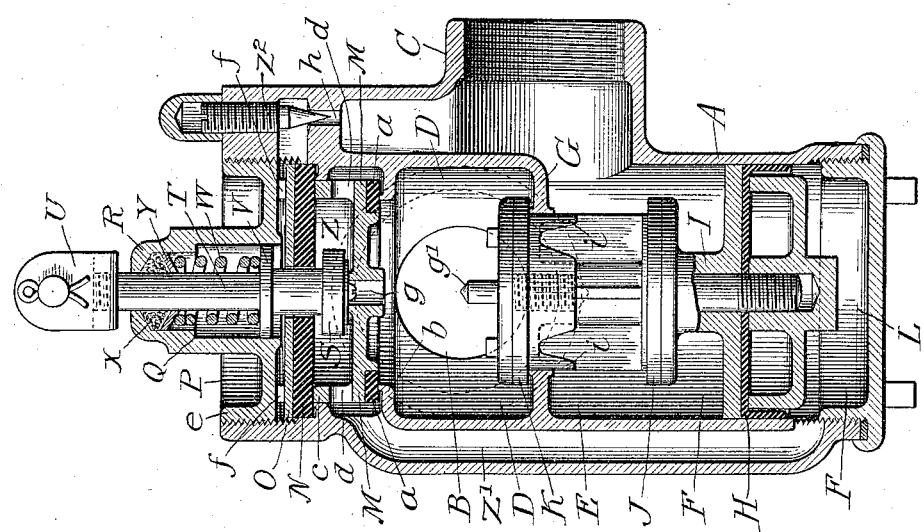

UNITED STATES PATENT OFFICE.

EARL G. WATROUS, OF CHICAGO, ILLINOIS.

FLUSHING-VALVE.

1,179,587.  Specification of Letters Patent.  Patented Apr. 18, 1916.

Application filed April 30, 1913. Serial No. 764,495.

*To all whom it may concern:*

Be it known that I, EARL G. WATROUS, a citizen of the United States, residing at Chicago, in the county of Cook and State of Illinois, have invented a certain new and useful Improvement in Flushing-Valves, of which the following is a description, reference being had to the accompanying drawings, forming part of this specification.

My invention has for its object the production of an improved and simplified construction of valve adapted primarily for use as a seat-action valve, but also capable of use as a manually operated valve. Its novelty will be hereinafter set forth and specifically pointed out in my claims.

In the accompanying drawings, Figure 1 represents a middle vertical section of my improved valve in the plane of the axis of the discharge pipe and at right angles to that of the inlet pipe, with the parts in normal position; and Fig. 2 a corresponding view with the parts in the position they occupy during the time the seat is depressed.

The casing A of the valve, of generally cylindrical form, is provided with a connection B for the inlet pipe and a connection C for the discharge pipe, and has its interior divided into an inlet chamber D, an outlet chamber E and a piston chamber F, the inlet chamber D being separated from the outlet chamber E by a diaphragm G, and the outlet chamber E being separated from the piston chamber F by the piston H whose stem I carries the valves J and K, the former seating upwardly against a valve seat formed upon the under side of the diaphragm G when lifted into contact therewith by the piston H, Fig. 2, and the latter seating downwardly upon a similar seat formed upon the upper side of the diaphragm G when the parts are in normal position, Fig. 1.

The lower end of the casing A is closed by a screw cap L. The upper end of the inlet chamber D is closed by a disk M provided upon its under side with a circumferential groove or recess in which is seated a packing ring $a$ which rests upon a seat formed for it upon an internal annular flange $b$ of the casing, and is provided upon its upper side with a circumferential vertically extending flange $c$ having ports or openings $d$ in it. The flanged disk M is held in place by a pair of disks N, O, the former of which is made of rubber or other similar material and rests upon the upturned flange $c$ of the disk M, and the latter of which is formed of metal and rests upon the disk N. The valve casing is also provided with an internal annular shoulder or flange fitting around the upper end of the flange $c$ of the disk M and having a seat flange $c$ of the disk M and having a seat upon its upper side upon which the rubber disk N also rests to form a tight joint with the casing as well as with the flange $c$.

The disks N and O are themselves held in place by a disk P provided with an externally threaded upturned flange $e$ which screws into the internally threaded upper end of the casing and is provided upon its under side with a ring $f$ which rests upon the top of the disk O. This ring $f$ upon the under side of the disk P is not continuous, but is cut away at the points shown in the drawings to form ports or passages for a purpose hereafter explained. The disk P is also provided at its center with an upwardly extending cylindrical housing Q terminating in a cap R.

The disk M, which closes the upper end of the inlet chamber D, is provided with a central vertical opening $g$ which has a valve-seat formed around it upon the upper side of the disk to coöperate with a valve S which is carried by the lower end of a valve stem T which extends vertically through the disks N and O, housing Q, and cap R and carries upon its upper end a coupling member U for connection with the operating lever extending from the closet seat. The slightly enlarged lower end of the valve stem T, immediately above the valve S, passes loosely through central openings in the disks N and O, leaving a passageway for water around the stem, and within the lower end of the housing Q the stem has secured to or formed integral with it a disk or collar V upon which rests the lower end of a coiled spring W which is confined within the housing Q by the cap R which closes the upper end of said housing. A stuffing box is formed around the stem T where it passes through the cap R, a packing X being confined within the upper end of said cap, around the stem, by a concavo-convex disk Y resting upon the upper end of the spring W.

The space between the upper side of the disk M and under side of the disk N, inclosed by the vertical flange $c$ of the disk M, constitutes a supplemental valve chamber Z which communicates by the ports $d$ with a passage Z' leading to the lower end of the piston chamber F. When in its lower position the valve S rests upon the seat formed for it upon the upper side of the disk M and cuts off communication between the chamber Z and the inlet chamber D, and when it is in its upper position it rests against the under side of the disk N and closes the central passage through the same and the disk O, around the valve stem T, and thereby cuts off communication between the chamber Z and the space above the disk O. The latter space communicates through the ports $f$ with a restricted escape passage $h$ leading to the outlet C and controlled by the regulating screw $Z^2$.

The operation of the valve is as follows: When the supplemental valve S is lifted to its upper position, by the depression of the closet seat, the inlet chamber D is placed in communication, through the passage $g$, chamber Z, ports $d$ and passage Z' with the lower end of the piston chamber F, and the piston is lifted until the valve J seats against the under side of the diaphragm G, as shown in Fig. 2. A cylindrical stud $g'$ upon the upper side of the valve K enters and substantially closes the central opening $g$ in the disk M, as the parts are lifted to the position shown in Fig. 2, thereby restricting the flow of water through said opening and thence to the piston chamber F and serving to cushion the parts at the end of their upward movement. A slight discharge of water will occur between the unseating of the valve K and the seating of the valve J, affording a preliminary flush, but during the time the closet seat remains depressed further discharge will be prevented by the valve J. Upon the release of the closet seat the supplemental valve S will be again seated upon the upper side of the disk M and communication between the inlet chamber D and the piston chamber F be again cut off, and the piston chamber will be placed in communication, through the passage Z', ports $d$, supplemental valve chamber, and the central opening in the disks N and O around the valve stem T, with the space above the disk O, and thence with the restricted escape passage controlled by the regulating screw $Z^2$, with the result that the water under pressure which has been admitted to the under side of the piston, to lift the same, will be permitted to gradually escape therefrom at a rate determined by the adjustment of the regulating screw $Z^2$. The pressure in the inlet chamber D, exerted upon the upper side of the valve J, when the parts are in the position of Fig. 2, will unseat said valve as soon as the pressure beneath the piston is released, and the water will freely pass through the opening in the diaphragm G during the time the piston and valves are moving downward toward normal position, such movement being due both to the pressure of the water in the inlet chamber D and to the gravity of the piston and valves. As the parts approach normal position a fluted flange $i$ upon the under side of the valve K will first enter the valve seat in the diaphragm G and partially and gradually cut off the flow of water through the same before the valve K comes to its seat, and thereby prevent the shock and jar which might otherwise occur from a too abrupt cutting off of the flow of water, as well as providing the usual refill.

While, as heretofore stated, my improved valve has been primarily designed for use as a seat-actuated valve, it is capable of use, with advantageous results, as an ordinary slow-closing, manually-operated flushing valve, for which use the valve J may be omitted since it is not necessary, in manually-operated valves, to employ such a valve for cutting off the flow of water after the main inlet valve has been opened. Suitable provision for manually lifting the valve stem T and unseating the supplemental valve S will be made, if the valve is to be used as a manually operated one, although it would of course be possible to operate the valve by a direct upward pull upon the valve stem T with the hand.

It will be further noted that, in the preferred construction of my new valve, illustrated and described in the drawings the inlet chamber, outlet chamber, piston chamber and supplemental valve chamber are all arranged in axial line with each other, and inclosed within a symmetrical and substantially cylindrical casing. The location of the supplemental valve chamber Z immediately above the inlet chamber D and in axial line therewith enables me to effectively control the closing movement of the valve J by means of the plug or pin $g'$ projecting upward from the valve K and cooperating with the axially located port $g$ connecting the inlet chamber D with the supplemental valve chamber Z. When the supplemental valve S is lifted, and pressure thereby admitted from the inlet chamber D through the port $g$, supplemental valve chamber Z and passage Z' to the lower end of the piston chamber L, the valves J and K are very quickly lifted by the pressure thus admitted to the lower end of the piston chamber, and but for the control of such movement of the valves as they approach their upward limit of movement, by the cooperation of the plug $g'$ with the port $g$, shock and jar, or hammering, would be likely to occur. The entrance of the upper end of the plug $g'$, however, as the parts approach their upward limit of movement, restricts the passage of water from the inlet chamber D to the lower end of the piston chamber L, and thereby retards and arrests the upward movement of the piston and the valves connected with and carried by it, and insures a quiet closing of the valve J.

Having thus fully described my invention, I claim:

1. In a flushing valve, the combination of a valve casing containing an inlet chamber, an outlet chamber, a piston chamber and a supplemental valve chamber, said supplemental valve chamber communicating with the inlet chamber and the piston chamber and also with a restricted escape passage, a valve located in the inlet chamber and controlling communication between the same and the outlet chamber when in its lower position, and controlling communication between the inlet chamber and supplemental valve chamber when in its upper position, a piston in the piston chamber for operating said valve, and a supplemental valve located in the supplemental valve chamber and controlling the communication of said chamber with the inlet chamber and with the restricted escape passage, and operating to place said supplemental valve chamber alternately in communication with said inlet chamber and said escape passage; substantially as described.

2. In a flushing valve, the combination of a valve casing containing an inlet chamber, an outlet chamber, a piston chamber, and a supplemental valve chamber, said supplemental valve chamber communicating with the inlet chamber by an axial port and with the piston chamber by a lateral port, and communicating also with a restricted escape passage, a valve in the inlet chamber controlling communication between said chamber and the outlet chamber when in its lower position, and provided with a plug or pin coöperating with the axial port between the inlet chamber and supplemental valve chamber when in its upper position, to control communication between said chambers, a piston in the piston chamber for operating said valve, and a supplemental valve located in the supplemental valve chamber and controlling communication between said chamber and the inlet chamber and restricted escape passage, and operating to place said supplemental valve chamber alternately in communication with the inlet chamber and with the restricted escape passage; substantially as described.

3. In a flushing valve, the combination of a valve casing containing an inlet chamber, an outlet chamber, a piston chamber and a supplemental valve chamber, said supplemental valve chamber communicating with the inlet chamber and the piston chamber and also with a restricted escape passage, and the inlet and outlet chambers being separated by a diaphragm having valve seats formed on its opposite sides, a valve in the inlet chamber coöperating with one of said seats when in its lower position, to control communication between the inlet chamber and outlet chamber, and operating when in its upper position to control communication between the inlet chamber and the supplemental valve chamber, a valve in the outlet chamber coöperating with the other one of the two valve seats when in its upper position, to control communication between the inlet chamber and outlet chamber, a piston in the piston chamber for operating said valves, and a supplemental valve located in the supplemental valve chamber and controlling communication between said chamber and the inlet chamber and restricted escape passage, and operating to place said supplemental valve chamber alternately in communication with the inlet chamber and with the restricted escape passage; substantially as described.

4. In a flushing valve, the combination of a valve casing containing an inlet chamber, an outlet chamber, a piston chamber, and a supplemental valve chamber, said supplemental valve chamber communicating with the inlet chamber by an axial port and with the piston chamber by a lateral port, and communicating also with a restricted escape passage, and the inlet and outlet chambers being separated by a diaphragm having valve seats formed on its opposite sides, a piston in the piston chamber, a valve carried by the piston and coöperating with the valve seat on the under side of the diaphragm when the piston is in its upper position, a second valve carried by the piston and coöperating with the valve seat on the upper side of the diaphragm when the piston is in its lower position, and provided with a plug or pin coöperating with the axial port between the inlet chamber and supplemental valve chamber when the piston is in its upper position, and a supplemental valve located in the supplemental valve chamber and controlling communication between said chamber and the inlet chamber and restricted escape passage, and operating to place said supplemental valve chamber alternately in communication with the inlet chamber and with the restricted escape passage; substantially as described.

5. In a flushing valve, the combination of the casing A containing the inlet chamber D, outlet chamber E and piston chamber F, the chambers D and E being separated by the diaphragm G having valve seats formed upon its opposite sides, the valve K coöperating with one of said seats and the valve J coöperating with the other, and the piston H connected with and moving in unison with said valves, the disk M closing the upper end of the inlet chamber D and provided with a central opening $g$ and with the upturned flange $c$ having the ports $d$ communicating with a passage $Z'$ leading to the lower end of the piston chamber F, the disks N, O, seated upon the upper edge of the flange $c$ of the disk M and coöperating with said flanged disk to form a supplemental valve chamber Z, the supplemental valve S located in the chamber Z and having a stem passing loosely through a central opening in the disks N and O, said valve operating in one position to close the passage $g$ leading to the inlet chamber D and in its other position to close the passage around its stem through the disks N and O, a closure for the upper end of the valve casing above the disk O leaving a space between them in communication with a restricted escape passage $h$, and a spring W for yieldingly holding the supplemental valve S in and returning it to normal position, substantially as described.

6. In a flushing valve, the combination of the casing A containing the inlet chamber D, outlet chamber E and piston chamber F, the chambers D and E being separated by the diaphragm G, having valve seats formed upon its opposite sides, the valve K coöperating with one of said seats and the valve J coöperating with the other, and the piston H connected with and moving in unison with said valves, the disk M closing the upper end of the inlet chamber D and provided with a central opening $g$ and with the upturned flange $c$ having the ports $d$ communicating with a passage $Z'$ leading to the lower end of the piston chamber F, the disks N, O, seated upon the upper edge of the flange $c$ of the disk M and coöperating with said flanged disk to form a supplemental valve chamber Z, the supplemental valve S located in the chamber Z and having a stem passing loosely through a central opening in the disks N and O, said valve operating in one position to close the passage $g$ leading to the inlet chamber D and in its other position to close the passage around its stem through the disks N and O, a flanged disk P screwed into the upper end of the valve casing and serving to hold the disks N and O in place, with a space between the disks P and O communicating with a restricted escape passage $h$ controlled by a regulating screw $Z^2$, the disk P being provided with the central cylindrical housing Q, and the spring W and packing X confined in said housing, around the valve stem T, by the cap R; substantially as described.

7. In a flushing valve, the combination of a valve casing containing an inlet chamber, an outlet chamber, a piston chamber and a supplemental valve chamber permanently open to the piston chamber, said four chambers being arranged in axial alinement with each other within the valve casing and the supplemental valve chamber communicating with the inlet chamber and a restricted escape passage respectively, through valve seats substantially concentric with said chambers and opposite each other within the supplemental valve chamber, a valve in the inlet chamber controlling communication between said chamber and the outlet chamber, a piston in the piston chamber operating to lift and open said valve when the supplemental valve chamber is placed in communication with the inlet chamber, and a supplemental valve in the supplemental valve chamber coöperating with said seats therein and operating to place said supplemental valve chamber alternately in communication with the inlet chamber and with the restricted escape passage.

8. In a flushing valve, the combination of a valve casing containing an inlet chamber, an outlet chamber, a piston chamber, and a supplemental valve chamber permanently open to the piston chamber, said four chambers being arranged in axial alinement with each other within the valve casing, the inlet chamber being separated from the outlet chamber by a diaphragm having a valve seat formed upon its upper side and the supplemental valve chamber having communication with the inlet chamber and a restricted escape passage respectively through valve seats substantially concentric with said chambers and oppositely located with respect to said supplemental chamber, a valve in the inlet chamber coöperating with the first said valve seat, a piston in the piston chamber connected to and moving in unison with said valve and operating to lift and open said valve when the supplemental chamber is placed in communication with the inlet chamber, and a supplemental valve in the supplemental valve chamber coöperating with said seats therein and operating to place said supplemental valve chamber alternately in communication with the inlet chamber and said escape passage.

9. In a flushing valve, the combination of a valve casing containing an inlet chamber, an outlet chamber, a piston chamber, and a supplemental valve chamber, said four chambers being arranged in axial line with each other within the valve casing, and a supplemental valve chamber communicating with the inlet chamber and with the piston chamber and also with a restricted escape passage, a valve in the inlet chamber closing communication between said chamber and the outlet chamber when in its closed position and restricting communication between the inlet chamber and the supplemental valve chamber when in its open position, a piston in the piston chamber for operating said valve, and a supplemental valve in the supplemental valve chamber controlling communication between said chamber and the inlet chamber and restricted escape passage, and operating to place said supplemental valve chamber alternately in communication with the inlet chamber and with the restricted escape passage; substantially as described.

10. In a flushing valve, the combination of a valve casing containing an inlet chamber, an outlet chamber, a piston chamber, and a supplemental valve chamber, said four chambers being arranged in axial line with each other within the valve casing, and the supplemental valve chamber communicating with the inlet chamber by an axial port and with the piston chamber by a lateral port, and communicating also with a restricted escape passage, a valve in the inlet chamber controlling communication between said chamber and the outlet chamber and provided with an axial plug or pin coöperating with the axial port between the inlet chamber and supplemental valve chamber when said valve is opened, a piston in the piston chamber for operating said valve, and a supplemental valve in the supplemental valve chamber controlling communication between said chamber and the inlet chamber and restricted escape passage, and operating to place said supplemental valve chamber alternately in communication with the inlet chamber and with the restricted escape passage; substantially as described.

11. In a flushing valve, the combination of a valve casing containing an inlet chamber, an outlet chamber, a piston chamber, and a supplemental valve chamber, said four chambers being arranged in axial line with each other within the valve casing, and the supplemental valve chamber communicating with the inlet chamber and with the piston chamber and also with a restricted escape passage, a valve in the inlet chamber controlling communication between said chamber and the outlet chamber when in its lower position and controlling communication between the inlet chamber and the supplemental valve chamber when in its upper position, a valve in the outlet chamber controlling communication between said chamber and the inlet chamber when the valve is in its upper position, a piston in the piston chamber for operating said valves, and a supplemental valve in the supplemental valve chamber controlling communication between said chamber and the inlet chamber and restricted escape passage, and operating to place said supplemental valve chamber alternately in communication with the inlet chamber and with the restricted escape passage; substantially as described.

12. In a flushing valve, the combination of a valve casing containing an inlet chamber, an outlet chamber, a piston chamber, and a supplemental valve chamber, said four chambers being arranged in axial line with each other within the valve casing, and the supplemental valve chamber communicating with the inlet chamber by an axial port and with the piston chamber by a lateral port, and communicating also with a restricted escape passage, a valve in the inlet chamber controlling communication between said chamber and the outlet chamber when in its lower position and provided with a plug or pin coöperating with the axial port between the inlet chamber and supplemental valve chamber to control communication between said chambers when said valve is in its upper position, a valve located in the outlet chamber and controlling communication between said chamber and the inlet chamber when said valve is in its upper position, and a supplemental valve in the supplemental valve chamber controlling communication between said chamber and the inlet chamber and restricted escape passage, and operating to place said supplemental valve chamber alternately in communication with the inlet chamber and with the restricted escape passage, substantially as described.

13. In a flushing valve, the combination of a valve casing containing an inlet chamber, an outlet chamber, a piston chamber, and a supplemental valve chamber, said four chambers being arranged in axial line with each other within the valve casing, and the supplemental valve chamber communicating with the inlet chamber by an axial port and with the piston chamber by a lateral port, and communicating also with a restricted escape passage, a piston in the piston chamber, a valve carried by said piston and located in the outlet chamber and serving to control communication between said chamber and the inlet chamber when the piston is in its upper position, a second valve also carried by said piston and located in the inlet chamber, and serving to control communication between said chamber and the outlet chamber when the piston is in its lower position, and provided with a plug or pin coöperating with the axial port between the inlet chamber and supplemental valve chamber when the piston is in its upper position, to control communication between said chambers, and a supplemental valve in the supplemental valve chamber controlling communication between said chamber and the inlet chamber and restricted escape passage, and operating to place said supplemental valve chamber alternately in communication with the inlet chamber and with the restricted escape passage; substantially as described.

14. In a flushing valve the combination of the casing A containing the inlet chamber D, outlet chamber E, piston chamber F and supplemental valve chamber Z, the chambers D and E being separated by the diaphragm G having a valve seat formed upon its upper side, the flanged disk M forming the top of the inlet chamber D and bottom of the supplemental valve chamber Z and provided with the central port $g$ and lateral ports $d$, the latter ports communicating with the passage Z' leading to the bottom of the piston chamber F, the disks N, O, forming the top of the supplemental valve chamber Z and provided with central openings for the passage of the valve stem, the valve K located in the inlet chamber D and coöperating with a seat upon the diaphrgam G, the piston H located in the piston chamber and connected to and moving in unison with the valve K, and the supplemental valve S located in the supplemental valve chamber Z and carried by the valve stem T passing loosely through the central openings in the disks N, O, said valve S coöperating alternately with a valve seat upon the upper side of the disk M, to control the passage $g$, and with the under side of the disk N to control the passage through the disks N and O around the valve stem T, and the spring W operating to yieldingly hold the valve S in and return it to its normal position; substantially as described.

15. In a flushing valve, the combination of the casing A, containing the inlet chamber D, outlet chamber E, piston chamber F, and supplemental valve chamber Z, the chambers D and E being separated by the diaphragm G having a valve seat formed upon its upper side, the flanged disk M forming the top of the inlet chamber D and bottom of the supplemental valve chamber Z and provided with the central port $g$ and lateral ports $d$, the latter ports communicating with the passage Z' leading to the bottom of the piston chamber F, the disks N, O, forming the top of the supplemental valve chamber Z and provided with central openings for the passage of the valve stem, a closure P for the upper end of the valve casing, above the disks N, O, and serving to hold the latter in place, the space between said closure P and the disk O communicating with the restricted escape passage $h$ controlled by a regulating screw $Z^2$, a valve K in the inlet chamber D controlling communication between said chamber and the outlet chamber E, a piston H located in the piston chamber and connected to and moving in unison with the valve K, a supplemental valve S located in the supplemental valve chamber Z and carried by a valve stem T passing loosely through the central opening $d$ in the disks N and O, said valve coöperating with a valve seat on the upper side of the disk M, to control the passage $g$, and with the under side of the disk N to control the passage through said disk and the disk O around the valve stem T, the flanged disk P screwed into the upper end of the valve casing A above the disks N, O, and serving to hold the latter in position, and providing a space above the disk O communicating with a restricted escape passage $h$ controlled by a regulating screw $Z^2$, the disk P being provided with the central housing Q, the coiled spring W surrounding the valve stem T within said housing, and the packing X confined therein, around the valve stem T and above the spring W, by the cap R; substantially as described.

16. In a flushing valve, the combination of the casing, A containing the inlet chamber D, outlet chamber E, piston chamber F, and the supplemental controlling-valve chamber Z formed by the flanged disk M having the lateral ports $d$ communicating with the piston chamber and the central passage $g$ communicating with the inlet chamber, and the disks N, O, forming the top of said chamber and provided with the central openings leading to a space above the disks communicating with a restricted escape passage, in combination with the supplemental valve S carried by the valve stem T passing loosely through the openings in the disks N, O, and coöperating with a valve seat on the upper side of the disk M for controlling communication between the chamber Z and the inlet chamber, and coöperating with the under side of the disk N to control communication between the chamber Z and the restricted escape passage, and the spring W operating to yieldingly hold the valve S in and return it to its normal position; substantially as described.

17. In a flushing valve, the combination with the valve casing A, having an inlet and a piston chamber of the supplemental valve chamber Z located in the upper part thereof and formed of the flanged disk M having the lateral ports $d$ communicating with the piston chamber and the central passage $g$ communicating with the inlet chamber, the disks N, O, seated upon the flange of the disk M and forming the top of the chamber Z, the flanged disk P screwed into the upper end of the casing A and serving to hold the disks N, O, in position, the space between the disks O and P communicating with a restricted escape passage $h$ controlled by a regulating screw $Z^2$, the central housing Q formed upon the disk P and having its upper end closed by the cap R, the supplemental valve S located in the chamber Z and carried by a valve stem T passing loosely through a central opening in the disks N, O, and extending vertically through the housing Q and the cap R thereof, the valve S coöperating with a valve seat on the upper side of the disk M to control communication between the chamber Z and the inlet chamber, and with the under side of the disk N to control communication between the chamber Z and the restricted escape passage, the disk or collar V carried by the valve stem T within the housing Q, the spring W surrounding the stem T and resting upon the disk V, the disk Y resting upon the upper end of the spring W, and the packing X confined between the disk Y and the cap R around the valve stem T; substantially as described.

18. In a flushing valve, the combination with the valve casing A having an inlet and an outlet chamber and a piston chamber of the supplemental valve chamber Z located in the upper part thereof and formed of the flanged disk M having the lateral ports $d$ communicating with the piston chamber and the central passage $g$ communicating with the inlet chamber, the flexible disk N forming the top of the chamber Z and seated upon the upper edge of the flange $c$ of the disk N and also upon a surrounding internal flange or shoulder of the valve casing A, to form a tight joint with both the flange $c$ and the main valve casing, the metal disk O resting upon the disk N, the flanged disk P screwed into the upper end of the casing A and serving to hold the disks N and O in position, with a space between the disks O and P communicating with a restricted escape passage controlled by a regulating screw $Z^2$, and a supplemental valve S located in the chamber Z and carried by a stem T passing loosely through central openings in the disks N and O, said valve S coöperating with a seat upon the upper side of the disk M to control the passage $g$, and with the under side of the disk N to control the passage around the valve stem through the central openings in the disks N and O; substantially as described.

EARL G. WATROUS.

Witnesses:
 EVERARD RECTOR,
 ROBERT DOBBERMAN.

Copies of this patent may be obtained for five cents each, by addressing the "Commissioner of Patents, Washington, D. C."